ALEXANDER McCREIGHT, OF TRANQUILLITY, OHIO.

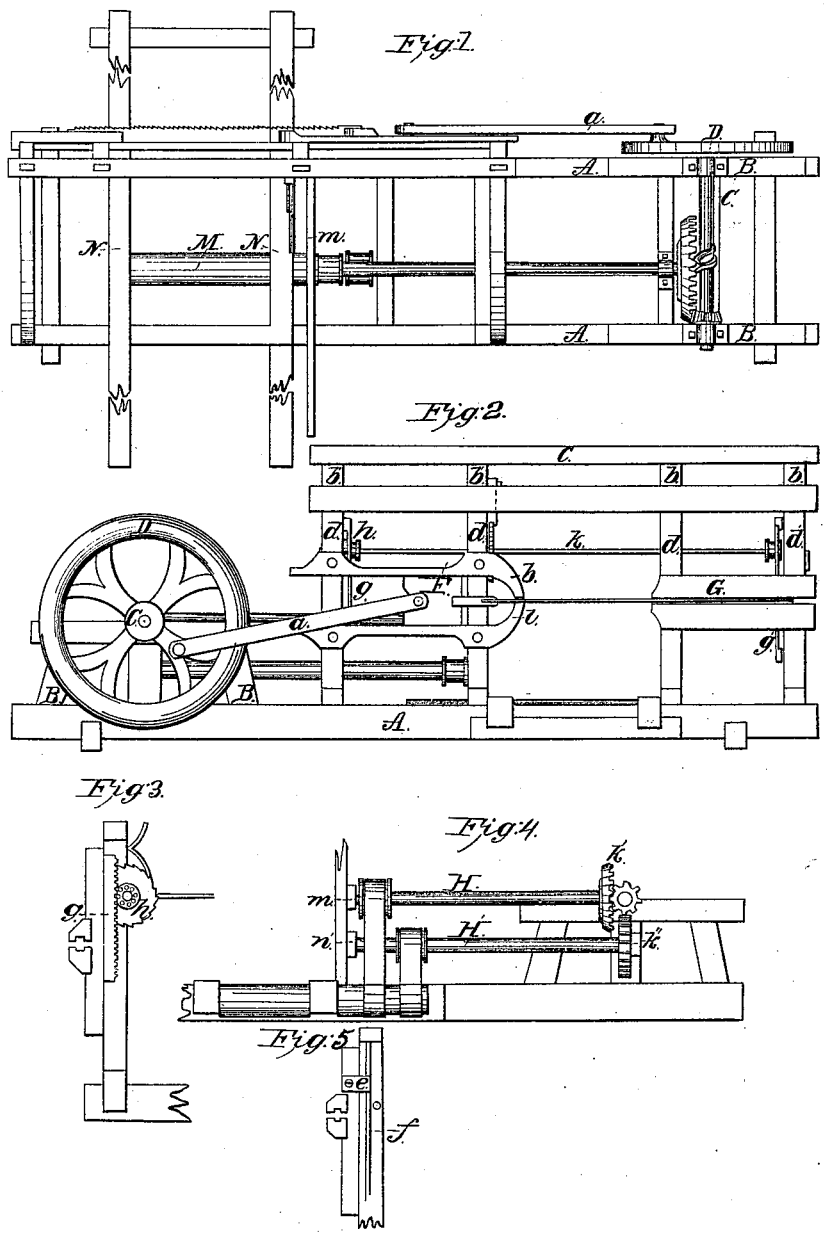

Letters Patent No. 82,970, dated October 13, 1868.

IMPROVEMENT IN SAW-MILLS.

The Schedule referred to in these Letters Patent and making part of the same.

*To all whom it may concern:*

Be it known that I, ALEXANDER McCREIGHT, of Tranquillity, in the county of Adams, and State of Ohio, have invented new and useful Improvements in Saw-Mills; and I do hereby declare that the following is a full and exact description of the same, reference being had to the accompanying drawings, and to the letters of reference marked thereon.

This invention consists primarily in such a construction and arrangement of a saw-mill, that the saw may be run in horizontal planes, thereby avoiding the ordinary spring in removing the slab, and permitting the same machinery to be used to saw logs or wood in short blocks for fuel or other purposes.

It also consists in certain feed-arrangements, in devices for raising and lowering the saw, and in guides for the same.

These features I proceed to set forth more fully, and illustrate in the annexed drawings, in which the same letters refer to identical parts in all the figures.

Figure 1 is a plan view of my improved mill, showing the carriage-way and frame-work for supporting the drive-wheel and connecting-gearing;

Figure 2 is a front view of the saw, with its supporting frame, guides, and connections;

Figure 3 is a view of the devices which raise and lower the saw-frame; and

Figure 4 is a detached view of the shafts, bands, and bevel-wheels and connections by which the log is fed up to the saw, and carried back from it.

My invention aims at accomplishing, in one simple and inexpensive machine, two important objects.

The first is to construct such a saw-mill that the slab may be removed without springing the log, or sawing it of unequal thickness in the removal of the slab. It is well known that in sawing logs of considerable length, when the slab is removed from one side by an upright saw, the log springs several inches laterally, and as the saw runs straight in the opposite side, the log will be of unequal thickness, and lumber thereby be wasted. This difficulty I avoid by the arrangement of devices, by which the saw is run in horizontal planes, while the log rests on rollers or cross-beams of the fixed carriage. Thus, while the slab is removed, the log is kept from springing by its own weight.

My second object is to provide a saw-mill, which, while it is of such general construction as to be transportable, is also convertible from a form in which it is fitted to saw logs longitudinally into planks, joists, or boards, and at the same time may be adjusted to cut logs transversely into sections for firewood, or other purposes. This object is also accomplished by the horizontal reciprocating movement of the saw, in combination with those devices by which the frame which carries the saw is lifted or depressed into other horizontal planes, it only being required that the saw should be half turned in order to bring the teeth downward.

The main basis which supports the saw and driving-machinery in my improved mill, is composed of the longitudinal timbers A A, properly secured with transverse beams. On one side of this frame are fixed trestles, B B, which carry in proper bearings the shaft C. To one end of this shaft the power is applied, and on the other is fixed a balance-wheel, D, on which is a wrist-pin, carrying the shaft $a$, that directly drives the saw.

One of the beams A A supports four vertical posts, $b\ b\ b'\ b'$, suitably braced and strengthened. Upon this frame, composed of posts $b\ b\ b'\ b'$, and beam $c$, slides vertically the frame $d\ d\ d'\ d'$. This frame is held upon the fixed frame by guides $e\ e$, Figure 5, which slide in the grooves $f\ f$, in the outer vertical posts. This frame carries two ratchet-bars, $g\ g$, which gear into ratchet-wheels $h\ h$, on the horizontal bar K, which has its bearings in the fixed frame, before described. This bar is rotated by a pivoted lever, which clutches into a ratchet-wheel, into which wheel also falls a pawl, to retain the frame at every required height.

On the two upright posts $b'\ b'$ of the movable frame, is fixed the guide F, so constructed as to guide the head-block of the saw, while its jaws, $l\ l$, projecting forward and inward, guide the blade of the saw. To the other uprights, $b\ b$, of the frame, the guide G is attached. This is made straight, in two parts, like the former, and provided with a race, in which runs the foot-block of the saw.

On the trestles B B, are two transverse beams, in which are the fixed bearings for the horizontal shafts H H'. The upper or crown-wheel K', on shaft H, gears into a cog-wheel on the end of the shaft C, and is rotated by its revolution. The under wheel, K", on shaft H', is revolved by a worm-screw, also on shaft C. Both these shafts, H and H', have their other bearings in the levers $m\ m'$, which levers serve to tighten or loosen the bands which transmit the motion of the shafts to the lower shaft M. This shaft extends beneath the carriage-way, and actuates the head-blocks carrying the log.

The carriage N N is fixed, and is provided with head-block, which may have friction-rollers, on which the log rests and slides, and to which the ropes from the shaft M are attached, to move the log forward and backward. The carriage N N may obviously be so constructed as to be removable when the mill is carried from one place to another. The whole mill would then be in such shape as to be conveniently placed on wheels for transportation.

The operation of my improved mill may easily be understood from the description of its parts. The power being applied to the shaft C, operates the saw, and, through the described gearing, moves the log on the carriage. The post of the sawyer being at the levers $m\ m'$, he is able to guide the log back and forth at pleasure. The slab being taken from the upper side, the weight of the log, as before explained, prevents springing.

By rotating the bar K, its lever being at his hand, the saw is lowered, so as to cut any desired thickness of plank.

For cutting logs or wood into sections for fuel, or other purposes, I provide guides, of the same construction, except that they permit the edge of the saw to turn downwards. Then the vertical movement of the sliding frame carries the saw vertically through the log, while the devices for carrying the log forward operate at intervals, as before, according to the will of the mill-man.

It will thus be seen that my mill may be applied to almost any work required on ordinary farms. The importance of the patentability of my mill, and its adaptability to different kinds of work, will appear from the fact, shown by experience, that the same power required to haul a log one mile to a mill, will saw it into planks.

Having thus fully described my invention, I wish it understood that I do not confine myself to the peculiar form of gearing shown, as many equivalent devices may be used without departing from the spirit of my invention; but

What I do claim, and desire to secure by Letters Patent of the United States, is—

1. The ratchet-bars $g\ g$, ratchet-wheels $h\ h$, and bar K, when combined with the fixed frame $b\ b\ b'\ b'$, moving frame $d\ d\ d'\ d'$, and operated substantially as described.

2. The shaft C, of the described mill, in combination with the shafts H and H', with their connections of gearing upon the shaft C, and bearings in the levers $m\ m'$, and connecting bands with roller M, all as and for the objects described.

This specification signed and witnessed, this 6th day of July, 1868.

ALEXANDER McCREIGHT.

Witnesses:
WM. P. BRECKENRIDGE,
ROBERT P. McEWEE.